United States Patent
Guo et al.

(10) Patent No.: US 7,339,507 B1
(45) Date of Patent: Mar. 4, 2008

(54) DEVICE FOR VIDEO DECODING

(75) Inventors: Jiun-In Guo, Computer Science and Information Engineering Department of CCU, 5F-5, 168 San-Hsing, Ming-Hsiung, Chia-yi (TW); Yao-Chang Yang, Chia-yi (TW)

(73) Assignee: Jiun-In Guo, Chia-Yi (TW)

( * ) Notice: Subject to any disclaimer, the term of this patent is extended or adjusted under 35 U.S.C. 154(b) by 0 days.

(21) Appl. No.: 11/519,922

(22) Filed: Sep. 13, 2006

(51) Int. Cl.
*H30M 7/00* (2006.01)
*H04N 11/02* (2006.01)

(52) U.S. Cl. .................. 341/107; 375/240.02; 382/247

(58) Field of Classification Search .................. 341/51, 341/107; 375/240.02, 240.26; 382/234, 382/239, 247
See application file for complete search history.

(56) References Cited

U.S. PATENT DOCUMENTS

| | | | |
|---|---|---|---|
| 5,450,562 A * | 9/1995 | Rosenberg et al. ............ 341/99 |
| 6,298,162 B1 * | 10/2001 | Sutha et al. ................. 382/234 |
| 6,661,422 B1 * | 12/2003 | Valmiki et al. .............. 345/530 |
| 7,061,410 B1 * | 6/2006 | Pearson et al. ............. 341/107 |
| 2005/0262375 A1 * | 11/2005 | Schumann ................... 713/500 |
| 2006/0023795 A1 * | 2/2006 | Kim .......................... 375/242 |
| 2007/0230570 A1 * | 10/2007 | Hu et al. ................ 375/240.02 |

* cited by examiner

*Primary Examiner*—Howard Williams
(74) *Attorney, Agent, or Firm*—Birch, Stewart, Kolasch & Birch, LLP

(57) ABSTRACT

A device for video decoding is disclosed. It includes at least a pipeline scheduler, a decoding core, a segmented context memory and a context cache. The pipeline scheduler and the decoding core could decrease the time taken in a code-decoding period. The segmented context memory and the context cache could reduce accessing time of reading and writing context values.

17 Claims, 11 Drawing Sheets

DEVICE FOR VIDEO DECODING

BACKGROUND

1. Field of Invention

The present invention relates to a device for video decoding. More particularly, the present invention relates to a device for decreasing the calculated amount of entropy coding in H.264/AVC video decoding standard.

2. Description of Related Art

There are two kinds of new H.264/AVC video decoding standard Entropy Coding algorithms. One is suitable for Context Adaptive Variable Length Coding (CAVLC) in Baseline Profile. The other is suitable for Context-based Adaptive Binary Arithmetic Coding (CABAC) in main profile.

Because CABAC refers to the context in the content, it is a more suitable way to code and enhance the efficiency of coding according to the probability distribution. CABAC uses the just coded symbols to estimate the probability for the next symbol to show up, and tremendously reduces the burdens between the symbols and with mobility adjusts every code of symbol to match the probability distribution. Therefore the compression rate could be very high.

The above-mentioned algorithm can save 50% more bit-rate than the known Variable Length Coding (VLC) in Entropy Coding. And CABAC can save 9% to 14% more bit-rate than CAVLC, but the price is that CABAC has at least 10% more calculating complexity than CAVLC. That is to say, if the two coding systems decode a symbol at the same time, CABAC wastes at least 10% more calculating complexity than CAVLC.

To achieve the goal of application on HDTV and spontaneous decoding in CABAC, the issue about how to enhance the whole efficiency and overall throughput rate when there are a tremendous amount of calculations is the problem that needs a solution.

In the main profile, except the header of the slice is decoded by the slice parser, macroblock (MB) and residual data are decoded by CABAC. The so-called slice is composed of numerous macroblocks, and an image can be composed of one or more slices. The slice is the smallest self-decodable unit in H.264/AVC video compression standard. That is, a slice can be decoded merely by self-decodable data instead of relying on another slice. The benefit is that when it is transmitted to the far end, after receiving the compressed data of the slice, it can be decoded at once and does not have to wait until the all the data is received completely. What's more, once the data is missing or mistaken in the transmitting process, it only affects the slice concerned and not the others.

Besides, CABAC defines a probability model by regularly updating the showing probability of 0 and 1 to decode the symbol directly, but increases higher probability dependence between every symbol. That is to say, the next symbol must wait. Not until the last symbol finishes updating the probability model can it proceed decoding. This process limits the data throughput in the unit time. This limitation is a bottleneck in calculating operations and a problem must to be solved in CABAC decoding design.

Refer to FIG. 1. FIG. 1 shows a schematic block diagram of a conventional decode-decision. There are two cores: maximum probability symbol (MPS) and least probability symbol (LPS). Through some mathematical operations, the two scores generate two sets of results, including the generated bit values, new context values, new probability model values and finally through the multiplexer to pick out a set of correct output results because under this known decode decision construction, only one bit can be generated in a period of time.

Refer to FIG. 2. FIG. 2 shows a schematic block diagram of the conventional decoding process. Three periods of time are needed to generate a symbol: read context memory, decode symbol and write context memory, each of which needs a period of time to complete. It is inefficient to take three periods of time to decode a symbol. The technology of the pipeline scheduler is the most direct and easiest method. It only makes the read context memory, the decode symbol and the write context memory operate overlapping in a period of time and works out this problem effectively.

SUMMARY

It is therefore an objective of the present invention to provide a video decoding device which adopts the pipeline scheduler in order to arrange the whole process of decoding, reduce the time of decoding and enhance the efficiency.

It is another an objective of the present invention to provide a video decoding device which adopts a context table in order to divide the context table into numerous sections, avoid wasting time waiting for the memory cache and improve the efficiency of context data access.

A video device adopting the pipeline scheduler is provided. In one embodiment of the present invention, the video device in accordance with the present invention includes three sets of decoding engines, a context model and probability model. The three sets of decoding engines are decode decision, decode bypass and decode terminate. When a symbol is decoded, only one set of decoding engines is used for each time according to the different needs of syntax elements. And when the decoding is finished, it is necessary to update the values in the context model and the probability model. Besides, this invention provides a look ahead parsing (LAP) technology to the decode decision in the three sets of engines in order to decode one more symbol in a period of time.

According to another objective of the present invention, a video decoding device is disclosed to efficiently control the memory by segmented context tables and context caches. In one embodiment of the present invention, the context tables can provide for accessing plenty of context data simultaneously in a period of time. The context caches previously read the context data that is soon used. When the interior decoding syntax circuit occurs, because only some of the specific context data are used, context caches can be saved in the context data that are used constantly in a short time. After the circuit is finished, the updated context data are written in the memory.

In conclusion, the invention efficiently enhances the overall throughput rate in the unit time and offers a method to shut down part of the decode engine to lower the waste of power consumption. Besides, this invention doesn't need to access the memory continually and reduces the waste of power.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings

DESCRIPTION OF THE PREFERRED EMBODIMENTS

Figure 1:
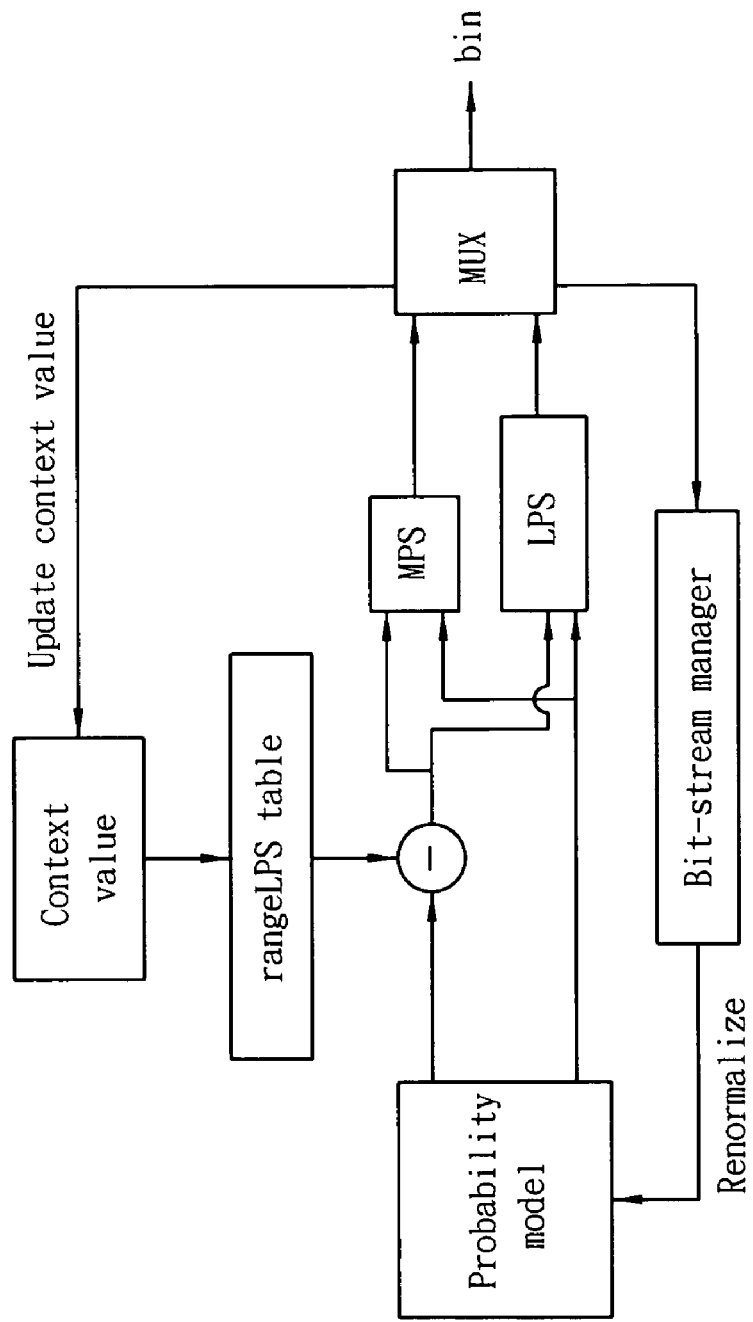
FIG. 1 is a schematic block diagram of a conventional decode-decision.
Figure 2:
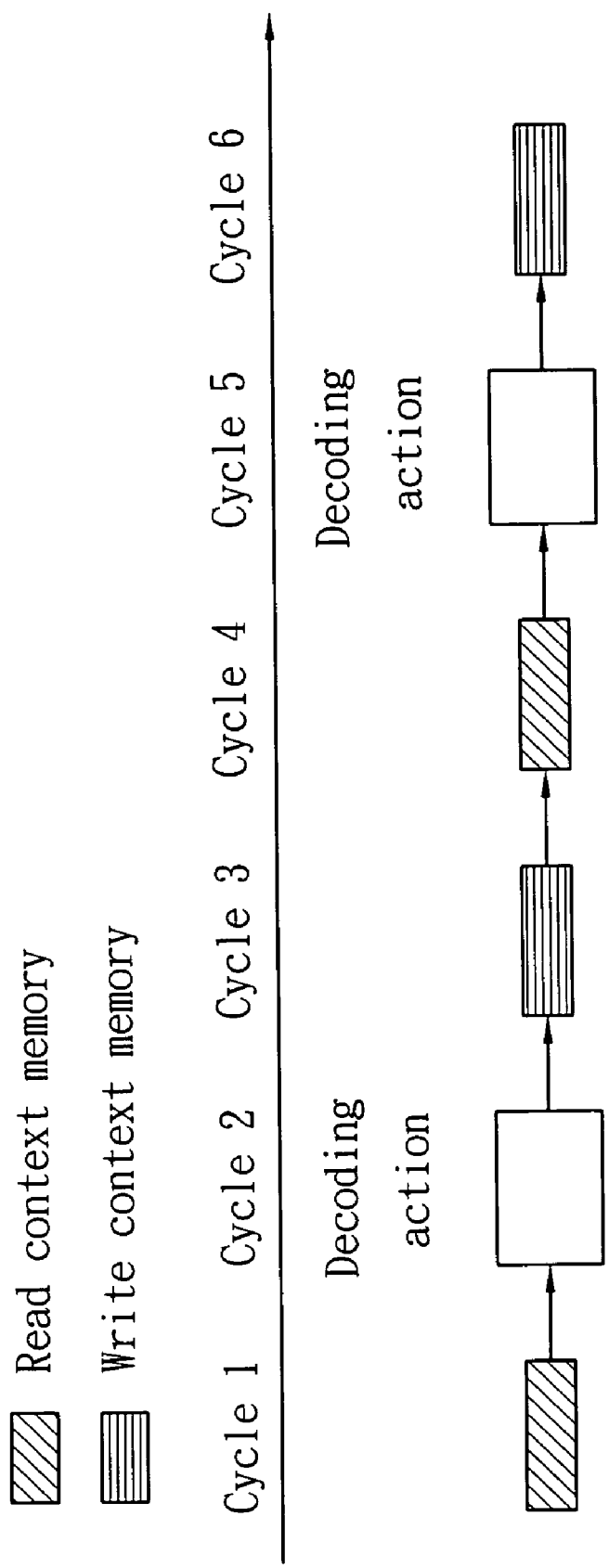
FIG. 2 is a schematic block diagram of conventional decoding process.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 3:
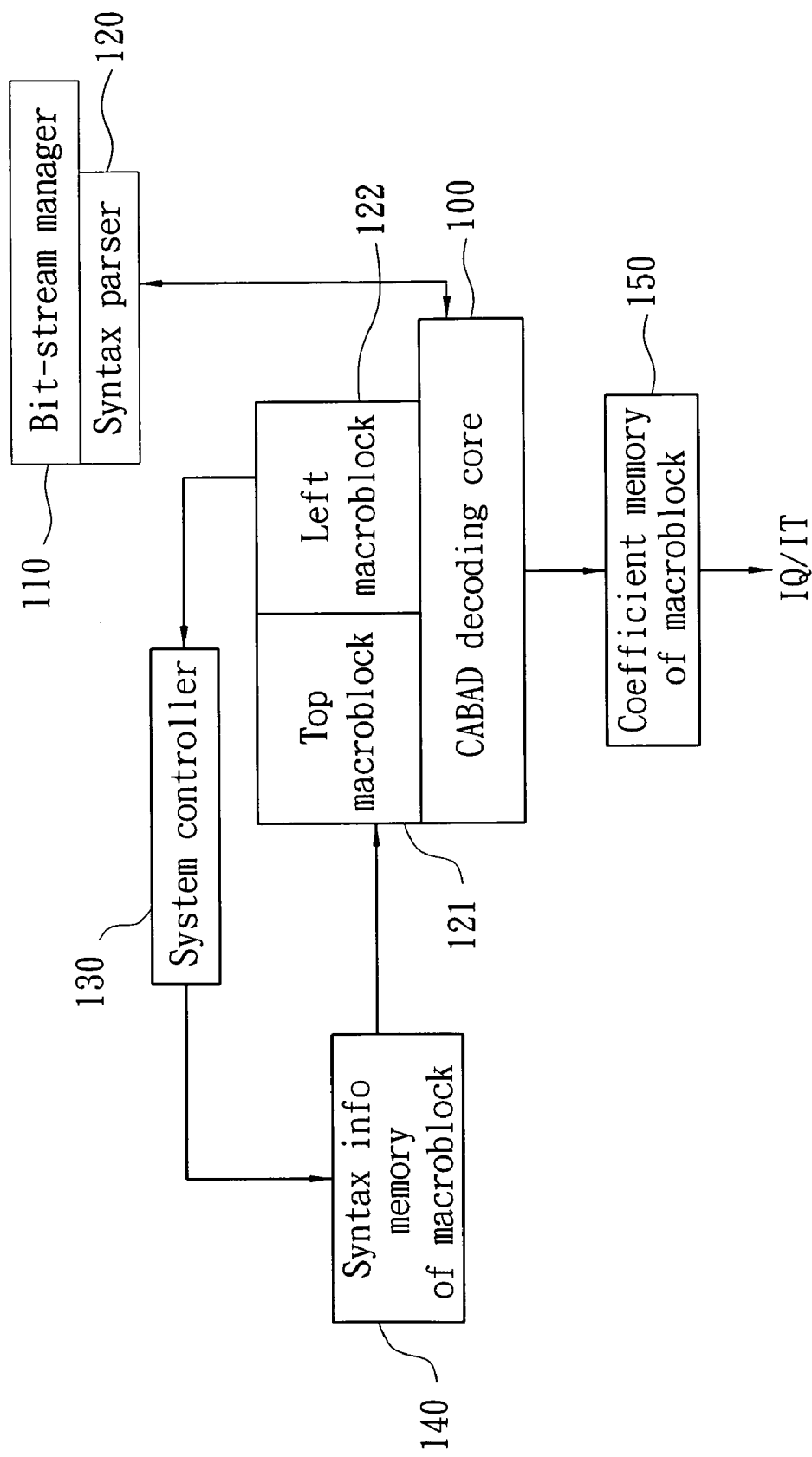
FIG. 3 is a schematic block diagram of CABAC in decoding system level of the preferred embodiment of the present invention.

Refer to FIG. 3. FIG. 3 shows a schematic block diagram of CABAC in the decoding system level of the preferred embodiment of the present invention. The decoding system includes a CABAC decoding core 100, a bit-stream manager 110, a syntax parser 120, a system controller 130, syntax info memory of a macroblock 140 and coefficient memory of a macroblock 150.

At first, the bit-stream manager 110 transmits bit-stream to syntax parser 120 in order to analyze the header of the slice, and then transmit the bit-stream to CABAC decoding core 100. System controller 130 prepares syntax info of the top macroblock 121 and the left macroblock 122 in syntax info memory of the macroblock 140. Two parts of the data will be generated after decoding operations of CABAC decoding core 100. One is the syntax data of the very macroblock, which is written into syntax info memory of the macroblock 140 through the system controller 130. The other is the remaining data, which is written into coefficient memory of the macroblock 150 to offer an inverse quantization (IQ) model and an inverse transform (IT) model to rebuild the data.

Figure 4:
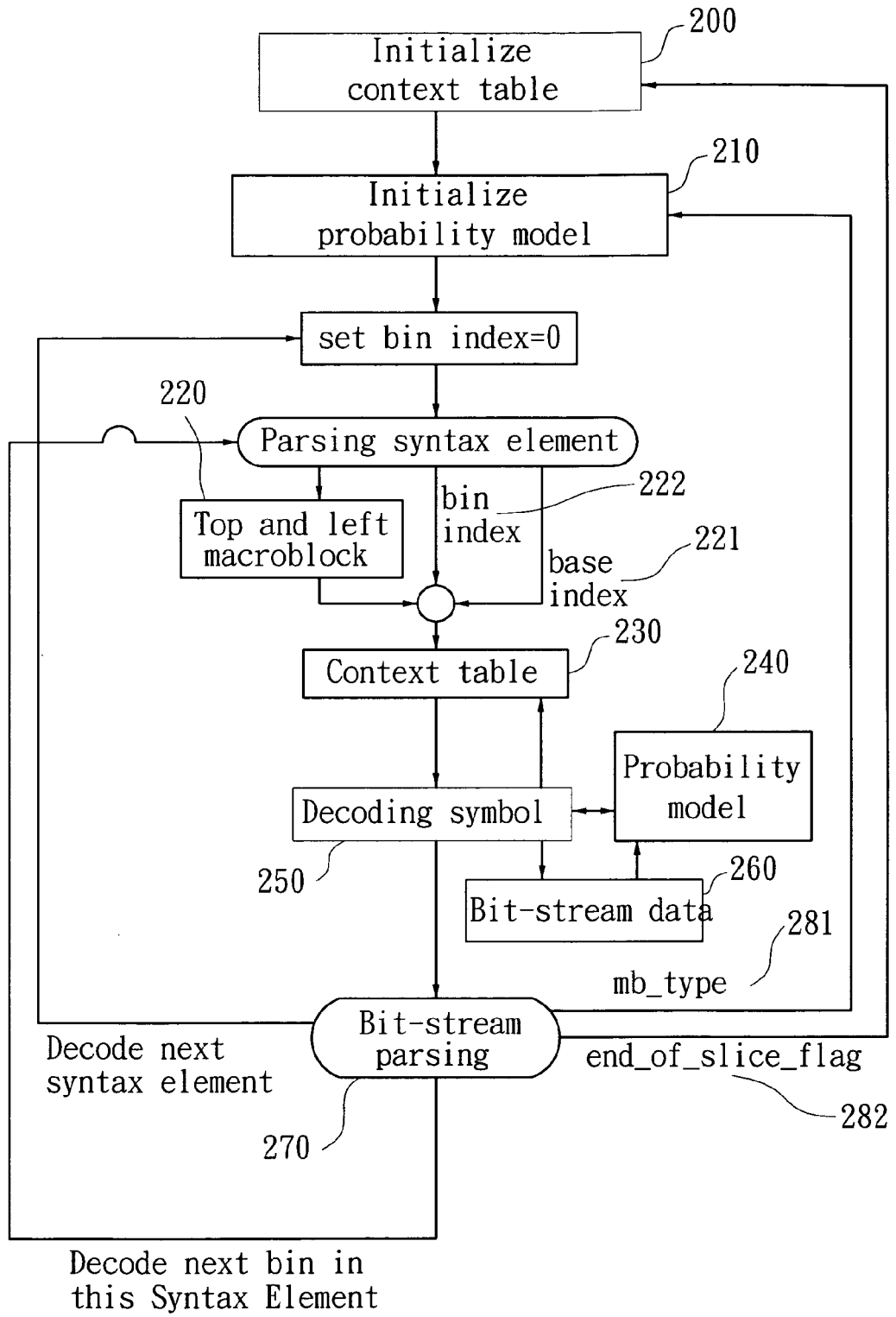
FIG. 4 is a decoding flow chart of CABAC of the preferred embodiment of the present invention.

Refer to FIG. 4. FIG. 4 shows a decoding flow chart of the CABAC of the preferred embodiment of the present invention. Before each slice starts to decode, the initialize context table 200 and the initialize probability model 210 are activated. The probability model 240 includes two numerals: codiRange and codiOffset. When a symbol is decoded, at first it is based on the syntax data in the upper and left macroblock 220 and cooperates with analyzing the base index 221 and the bin index 222 of the syntax factors to inquire the context table 230. The context numeral is finally determined. There are two factors in the context numeral: state and MPS. Based on the input value of the context table 230 and the probability model 240, the decoding symbol 250 can generate a bit (or called a symbol which has been mentioned in the previous descriptions). There are three sets of decode engines in the decoding symbol 250, in which each time one of the three is selected to decode symbols. Then, the decoding symbol 250 updates the context of the numerals and writes the probability numerals into the context table 230 and probability model 240 respectively.

Meanwhile, when the probability model 240 is updated, it might need to re-normalize the probability numerals from the bit-stream data 260. Every generated bit (or symbol) is checked by the bit-stream analysis 270 to make sure whether the decoded syntax bit-stream is finished or not. If the syntax is decoded completely, there are three situations. First, if the syntax 281 is "mb-type" and the acquired syntax value is "I_PCM", it is necessary to initialize the probability model 210 and go on to decode the next syntax. Second, if the syntax 282 is "end_of_slice_flag" and the acquired syntax is 1, the slice is decoded completely. It is necessary to initialize the context table 200 and initialize the probability model 210, and to repeat the process described in the beginning of this paragraph. Third, it is the remaining situation, it is only necessary to go on to decode the next syntax. If the syntax is not decoded completely yet it decodes the next bit in the decoding syntax.

Figure 5:
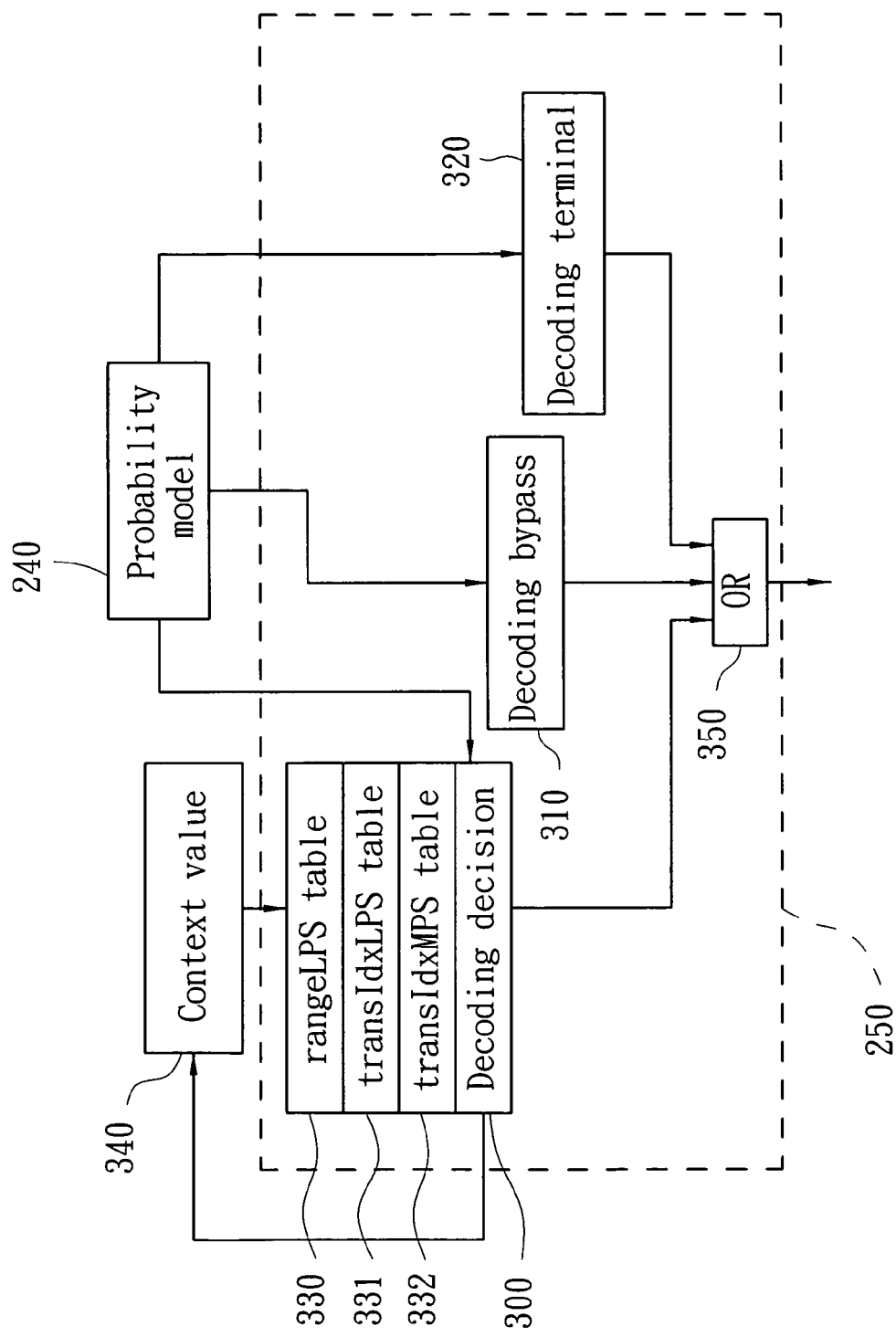
FIG. 5 is a schematic block diagram of CABAC decoding engines of the preferred embodiment of the present invention.

Refer to FIG. 5. FIG. 5 shows a schematic block diagram of the CABAC decoding engines of the preferred embodiment of the present invention. FIG. 5 shows the decoding symbol 250 in FIG. 4. In this block there are three decode engines: decode-decision 300, decode bypass 310 and decode terminate 320. The decode-decision 300 is the most to be used, and has a utility rate over 90%. The decode-decision 300 must proceed decoding operations according to the probability model 240 and the context value 230, and in the meantime it must refer to three tables: rangeLPS table 330, transIdxLPS table 331 and transIdxMPS 332 in order to update the context value 340. The remaining two engines can proceed decoding operations according to the probability model 240 described in FIG. 4.

Because each time only one decode engine is used, this embodiment in accordance with the present invention discloses a method to shut down the other two decode engines to reduce the waste of power. And according to this method, it can be sure that only one output is generated. Hence, when the last output is generated, only one OR logic gate 350 is used and multiplexers are not needed in order to reduce the cost of the hardware circuit area.

Figure 6:
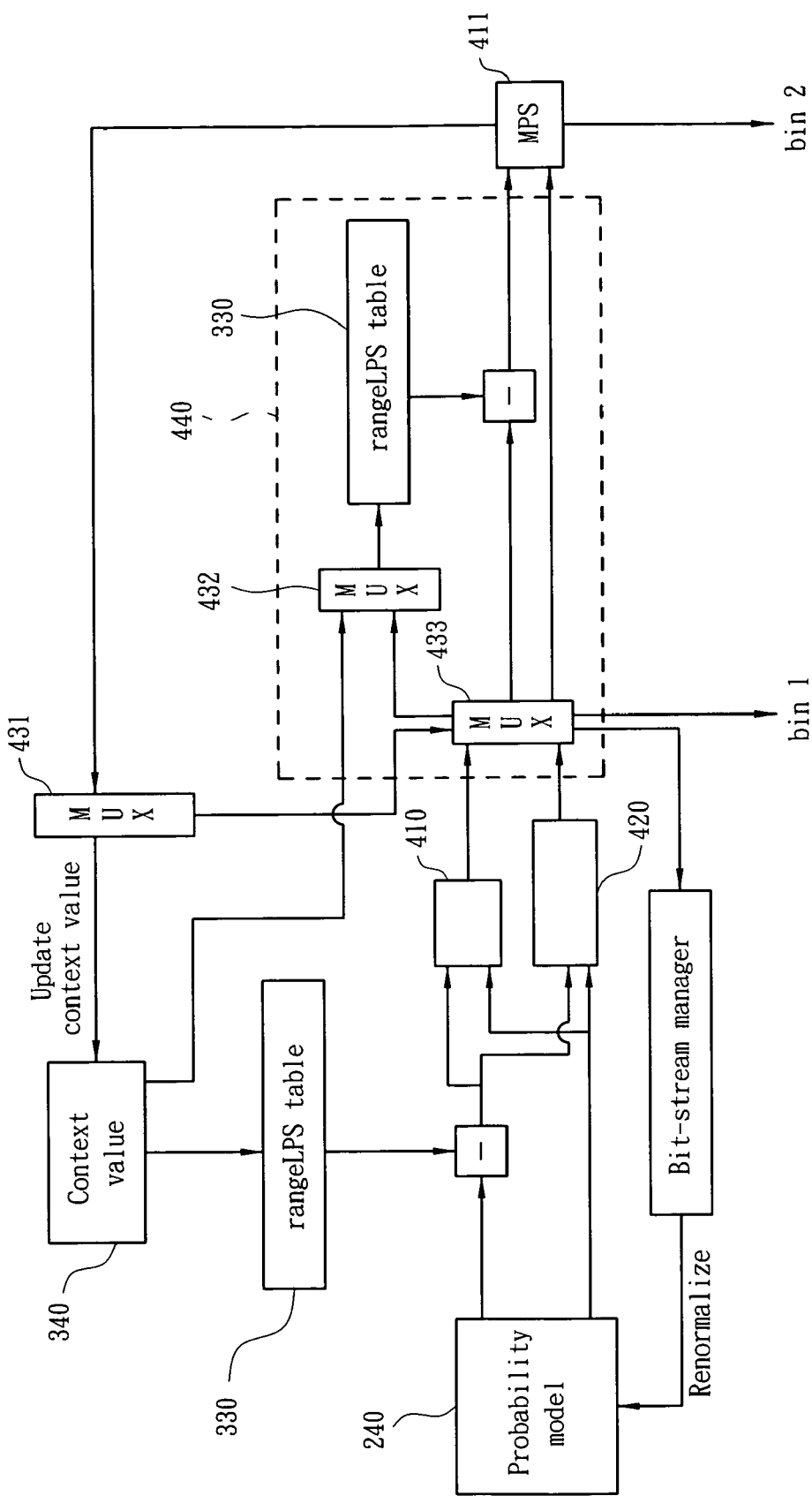
FIG. 6 is a schematic block diagram of decode-decision of look ahead parsing detector (LAPD) of the preferred embodiment of the present invention.

Refer to FIG. 6. FIG. 6 shows a schematic block diagram of decode-decision of look ahead parsing detector (LAPD) of the preferred embodiment of the present invention. This invention claims the technique of a promising syntax analysis to enhance the overall throughput rate and continue the original construction. The multiplexer 433 transmits the context value generated from the first half part to the look ahead parsing detector (LAPD) 440 and checks two conditions. One is that the value of the decode range is greater than 256 in the probability model 240. It represents that the probability model 240 doesn't need to be re-normalized in the bit-stream data. The other condition is that the codiRange is greater than or equal to the codiOffset. It represents that the bit must be generated by the maximum probability symbol 410 because when in the stage of maximum probability symbol 410, it only needs rangeLPS Table 330 to shift the state. And there are two pieces of information needed to check rangeLPS table 330: state and codiRange, which are chosen by MPS 432.

Due to the fact that there is only a shift state instead of other operations, the hardware cost and time influence of this part is quite limited, but it is able to increase the overall throughput rate efficiently. And the context value of look ahead parsing detector 440 may come from the result of maximum probability symbol 410 and from the other context value. The last written-back context value might come from the maximum probability symbol 410 or maximum probability symbol 411. MPS 431 chooses the last saved context value.

Figure 7A:
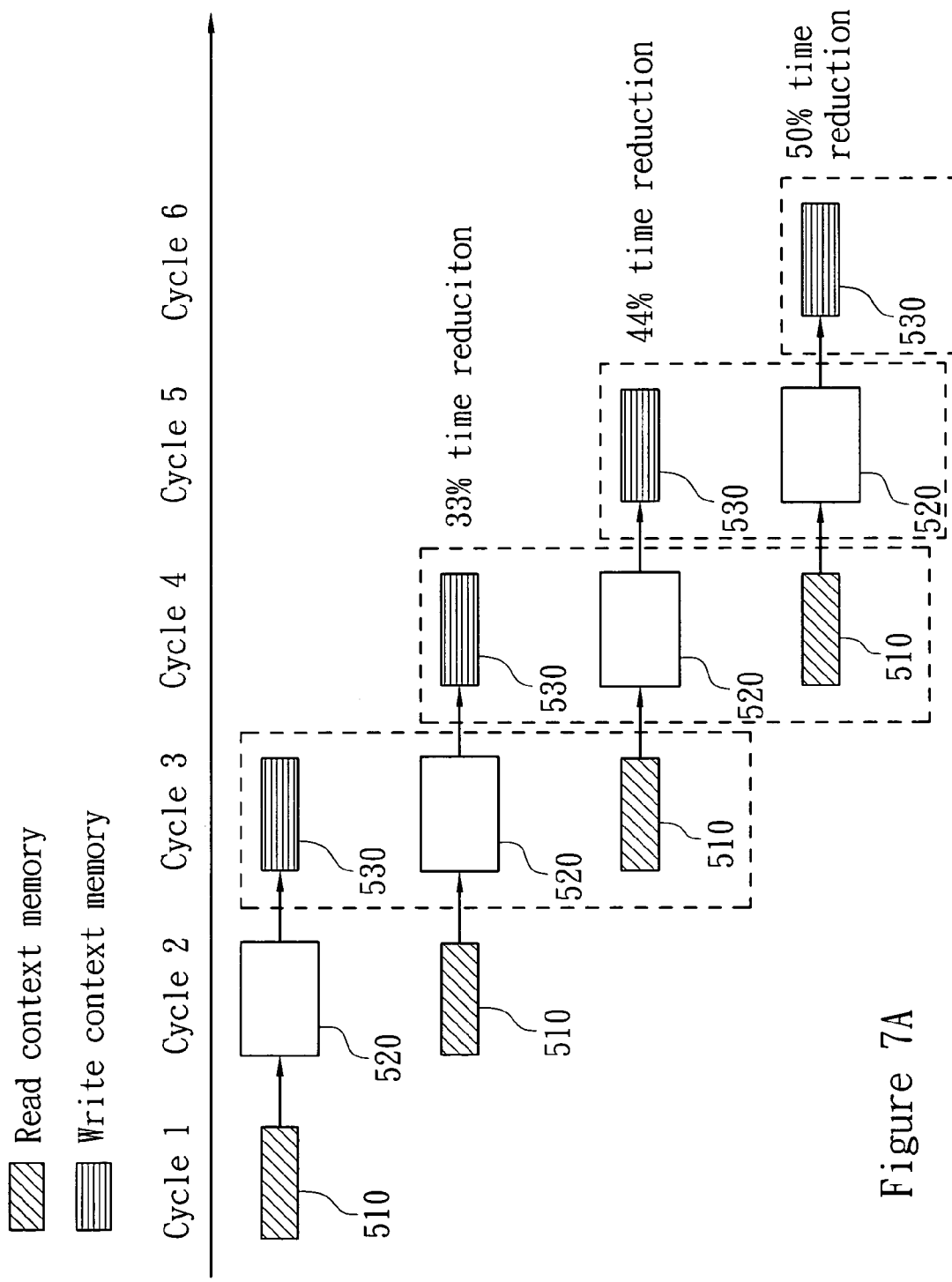
FIG. 7A is a schematic block diagram of pipeline decoding process of the preferred embodiment of the present invention.

Refer to FIG. 7A. FIG. 7A shows a schematic block diagram of the pipeline decoding process of the preferred embodiment of the present invention. FIG. 7A shows, if the pipeline steps are more, the overall economy rate can be improved between 33% and 50% or even more. Besides, one condition is that the syntax decoded in a circuit uses the context value taken from some specific addresses.

Figure 7B:
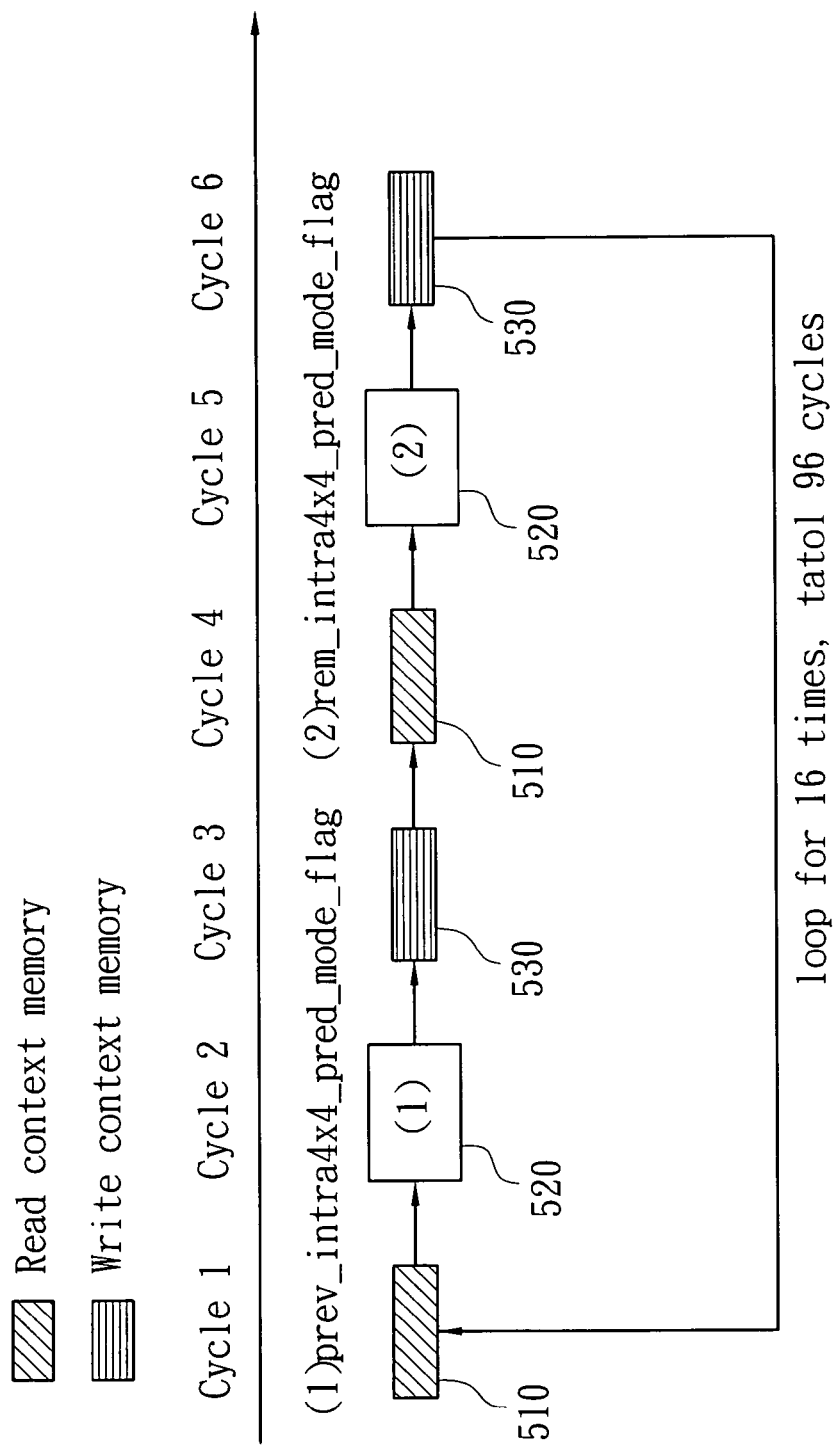
FIG. 7B is a schematic block diagram of decoding syntax elements of a loop of the preferred embodiment of the present invention.

Refer to FIG. 7B. FIG. 7B shows a schematic block diagram of the decoding syntax elements of a loop of the preferred embodiment of the present invention. As FIG. 7B shows, CABAC needs to decode two sequent syntaxes in sixteen loops: 1. prev_intra4x4_pred_mode_flag and 2. rem_intra4x4_pred_mode. Therefore, this embodiment allows the technique of cache context to reduce the times of context data access.

Figure 7C:
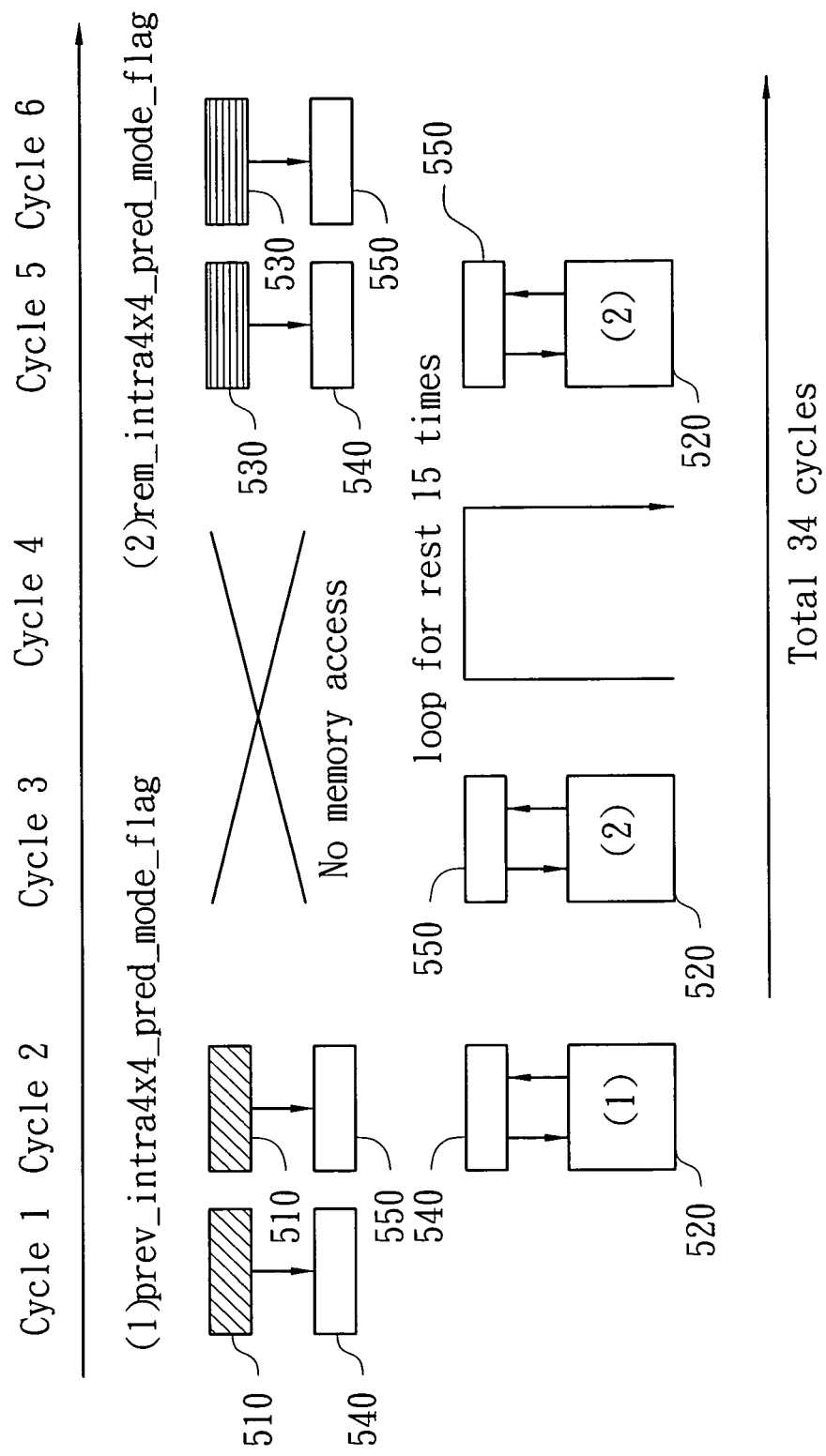
FIG. 7C is a schematic block diagram of decoding process of pipeline scheduler and context cache registers of the preferred embodiment of the present invention.

Refer to FIG. 7C. FIG. 7C shows a schematic block diagram of the decoding process of the pipeline scheduler and the context cache registers of the preferred embodiment of the present invention. The loop starts to read Context Memory 510 in the cache register 540 and the cache register 550, and finally from the cache register 540 and the cache register 550 writes the updated values back to the context memory 530. It is only necessary to read and write twice for each time. Compared to the sixteen times of reading and writing of the decode device in accordance with the prior art, it saves a lot of unnecessary memory access and indirectly lowers overall power consumption. Combining the method of the mentioned pipeline schedule and context cache, the period of time is reduced in decoding from 96 periods to 34 periods. There is an improvement of 61.4% in economical performance.

Figure 8:
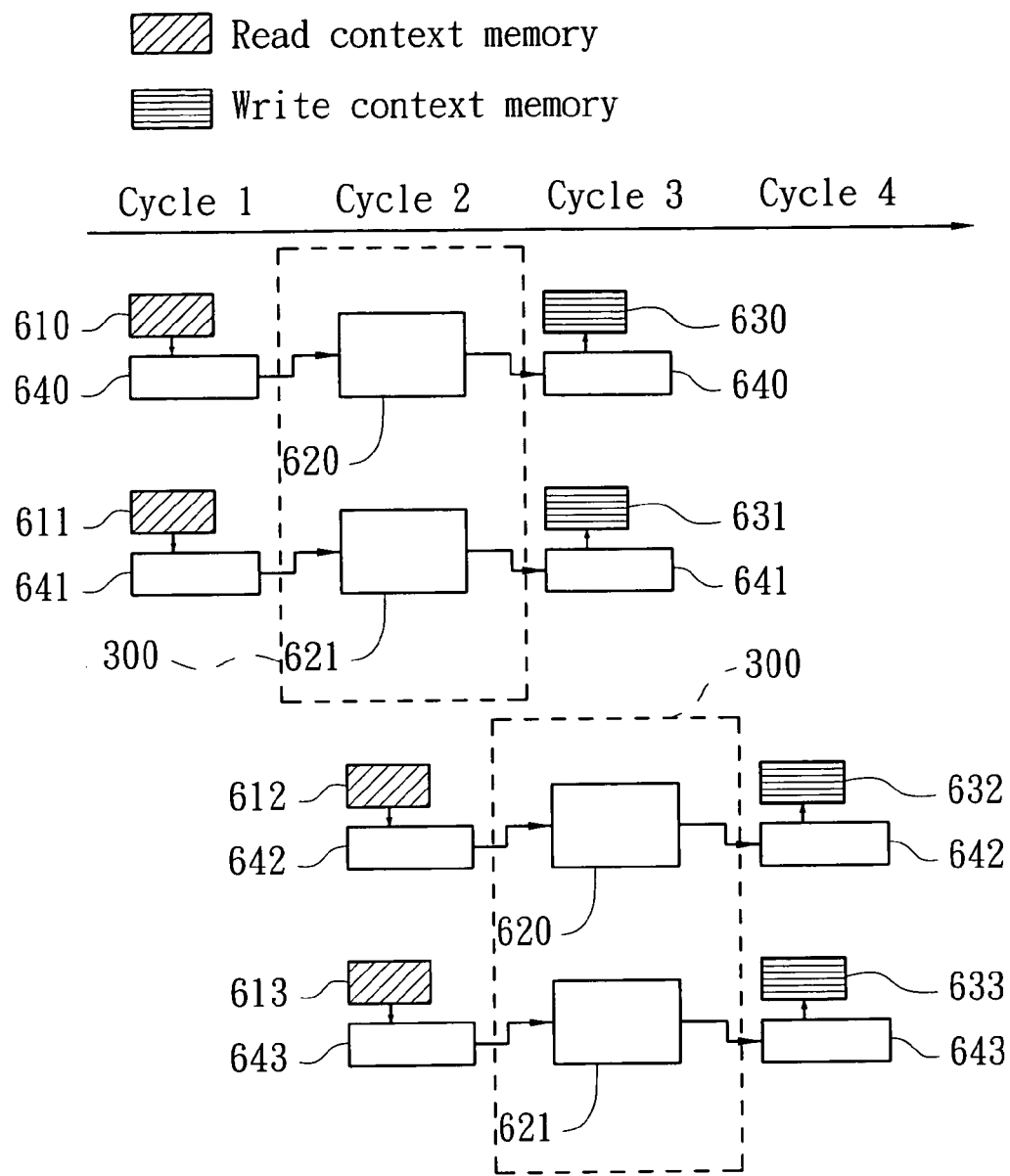
FIG. 8 is a schematic block diagram of system decoding process of the preferred embodiment of the present invention.

Refer to FIG. 8. FIG. 8 shows a schematic block diagram of the system decoding process of the preferred embodiment of the present invention. Two sets of context values are put into the first decode bin 620 and the second decode bin 621 is included in the decode decision 300. If there is only one block of memory, it is impossible to access two context data simultaneously. Therefore, the memory is divided into many blocks in order to offer cache context register 640, 641, 642, 643 to read simultaneously, just as the memory 610, 611, 612, 613, and the write at the same time, just as memory 630, 631, 632, 633.

Figure 9:
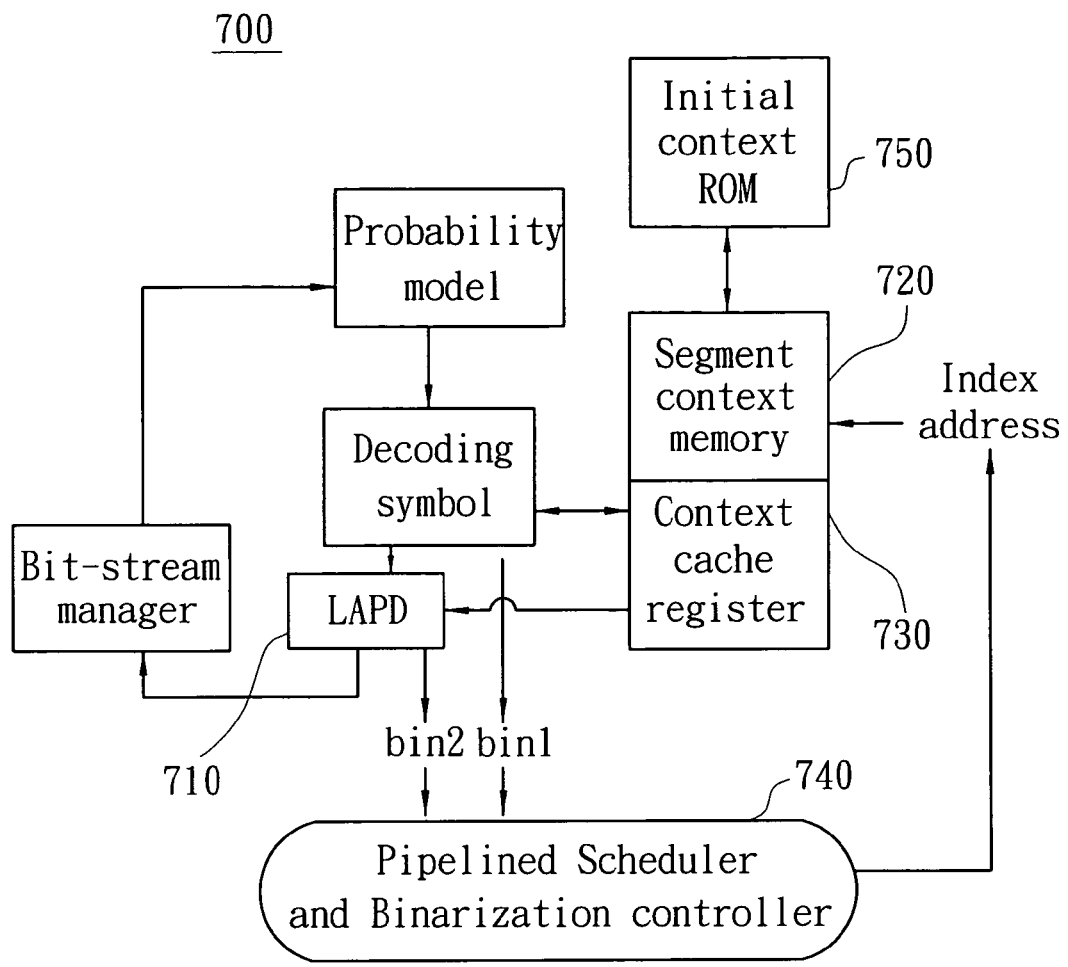
FIG. 9 is a schematic block diagram of CABAC decoding core of the preferred embodiment of the present invention.

Refer to FIG. 9. FIG. 9 shows a schematic block diagram of CABAC decoding core of the preferred embodiment of the present invention. The CABAC decoding core 700 includes a look ahead parsing detector 710, a segmented context memory 720 and a cache context 730, pipeline scheduler and binarization controller 740 (Pipeline scheduler needs to combine the result of binarization controller in order to proceed different schedules) and combines context ROM 750 to initialize.

If the analysis conditions in the look ahead parsing detector are met, one more symbol is decoded in a period of time, enhancing the throughput rate of this video decoding. Segmented context memory 720 can make the pipeline scheduler and binarization controller 740 proceed reading, decoding symbol and writing in the same memory in the same period of time. Cache context 730 can previously read the context data in order to avoid unnecessary waiting time and apply to the segmented context memory 720 to manage the context memory effectively. The pipeline scheduler and the binarization controller 740 control the inner part of decoding syntax or schedules of multiple decoding syntaxes.

This overall output of the CABAC decoding core can support the compressive format of 30 frames in one second in the HD1080 standard.

According to the above-mentioned preferred embodiment of the present invention, there are the following advantages if this invention is applied to:

1. The embodiment in accordance with the present invention offers a highly efficient context decode construction of video compressive standard. The Pipeline Scheduler can optimize the period of time for decoding a symbol.

2. The embodiment in accordance with the present invention applies to the look ahead parsing analysis technique and can decode one more symbol in each period of time. The technology of the segmented context table cooperating with the cache context can efficiently manage and reduce the times of accessing the memory.

3. The embodiment in accordance with the present invention can effectively reduce one period of time for decoding and reducing the times of accessing the memory enormously, and therefore reduce the waste of power in the whole decoding system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for video decoding, comprising:
   a pipeline scheduler selectively scheduling among multiple decoding syntaxes and controlling an inner part of one of the decoding syntaxes;
   a decoding core, comprising a look ahead parsing detector with analysis conditions, if the analysis conditions are met, one more symbol is decoded during one period;
   a segmented context memory, making the pipeline scheduler read and write in a memory at the same time; and
   a cache context register, previously reading a context data, and cooperating with the segmented context memory to manage a context memory.

2. The device for video decoding of claim 1, wherein the pipeline scheduler combines with a binarization controller.

3. The device for video decoding of claim 1, wherein a plurality of actions of the pipeline scheduler in the same period of time comprise reading memory, decoding symbol and writing memory.

4. The device for video decoding of claim 1, wherein the decoding core comprises at least one decoding engine.

5. The device for video decoding of claim 4, wherein the decoding engine is a decode-decision.

6. The device for video decoding of claim 5, wherein the decode-decision comprises a condition.

7. The device for video decoding of claim 6, wherein the condition is a codiRange greater than 256.

8. The device for video decoding of claim 6, wherein the condition is the codiRange equal to 256.

9. The device for video decoding of claim 6, wherein the condition is the codiRange greater than a codiOffset.

10. The device for video decoding of claim 6, wherein the condition is the codiRange equal to the codiOffset.

11. The device for video decoding of claim 6, wherein the condition is satisfied, the decode-decision decodes one more symbol during one period.

12. The device for video decoding of claim 4, wherein the decoding engine is a decode-bypass.

13. The device for video decoding of claim 4, wherein the decoding engine is a decode-terminal.

14. The device for video decoding of claim 4, wherein the decoding core decodes symbols, at least one decoding engine could be shut down.

15. The device for video decoding of claim 4, wherein the decoding core decodes symbols, opens only one decoding engine.

16. The device for video decoding of claim 1, wherein the decoding core comprises a logic gate.

17. The device for video decoding of claim 16, wherein the logic gate is an OR logic gate.

* * * * *